(12) United States Patent
Gutknecht-Stöhr et al.

(10) Patent No.: US 6,652,418 B1
(45) Date of Patent: Nov. 25, 2003

(54) DRIVE-TRAIN CONTROL SYSTEM OF A MOTOR VEHICLE

(75) Inventors: Florian Gutknecht-Stöhr, Regensburg (DE); Friedrich Graf, Regensburg (DE); Martin Lachmayr, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/702,023

(22) Filed: Oct. 30, 2000

Related U.S. Application Data

(63) Continuation of application No. PCT/DE99/01281, filed on Apr. 30, 1999.

(30) Foreign Application Priority Data

Apr. 30, 1998 (DE) .......................... 198 19 463

(51) Int. Cl.⁷ .......................... F16H 59/48; F16H 59/60
(52) U.S. Cl. .......................... 477/120; 477/97
(58) Field of Search .......................... 477/34, 115, 120; 74/336 R, 337; 701/56

(56) References Cited

U.S. PATENT DOCUMENTS

| | | | | |
|---|---|---|---|---|
| 4,677,880 A | * | 7/1987 | Hattori et al. .......... | 477/109 X |
| 4,819,187 A | * | 4/1989 | Yasue et al. .......... | 364/431.04 |
| 5,042,326 A | * | 8/1991 | Hibi et al. .......... | 477/120 X |
| 5,235,876 A | * | 8/1993 | Minowa et al. .......... | 74/866 |
| 5,470,290 A | * | 11/1995 | Minowa et al. .......... | 477/120 X |
| 5,476,425 A | * | 12/1995 | Shiraishi et al. .......... | 477/109 |
| 5,575,737 A | * | 11/1996 | Weiss .......... | 477/44 X |
| 5,580,334 A | * | 12/1996 | Minowa et al. .......... | 477/168 |
| 5,738,605 A | * | 4/1998 | Fliearman et al. .......... | 477/120 X |
| 5,778,329 A | * | 7/1998 | Officer et al. .......... | 477/151 X |
| 5,826,208 A | * | 10/1998 | Kuroiwa et al. .......... | 477/115 X |
| 6,070,118 A | * | 5/2000 | Ohta et al. .......... | 477/97 X |
| 6,095,117 A | * | 8/2000 | Minowa et al. .......... | 123/399 |
| 6,125,314 A | * | 9/2000 | Graf et al. .......... | 701/53 |
| 6,141,615 A | * | 10/2000 | Saito et al. .......... | 477/34 X |
| 6,345,222 B1 | * | 2/2002 | Toukura et al. .......... | 701/53 |

FOREIGN PATENT DOCUMENTS

| | | |
|---|---|---|
| DE | 33 34 722 A1 | 4/1985 |
| DE | 196 25 936 A1 | 1/1998 |
| EP | 0 576 703 A1 | 1/1994 |

OTHER PUBLICATIONS

Japanese Patent Abstract No. 07089373 A (Toshimichi et al.), dated Apr. 4, 1995.
International Publication WO 91/13780 (Graf), Sep. 19, 1991.

* cited by examiner

*Primary Examiner*—Roger Pang
(74) *Attorney, Agent, or Firm*—Laurence A. Greenberg; Werner H. Stemer; Gregory L. Mayback

(57) ABSTRACT

A drive-train control system is provided with an engine control system by which variables that influence the engine torque are controlled, a transmission control system by which a ratio of the transmission is controlled, and a map memory from which a set ratio of the transmission can be taken as a function of a torque demanded by the driver and of a variable linked to the vehicle speed, and the characteristics of which are defined in a vehicle-dependent manner taking into account the maximum possible torque.

7 Claims, 7 Drawing Sheets

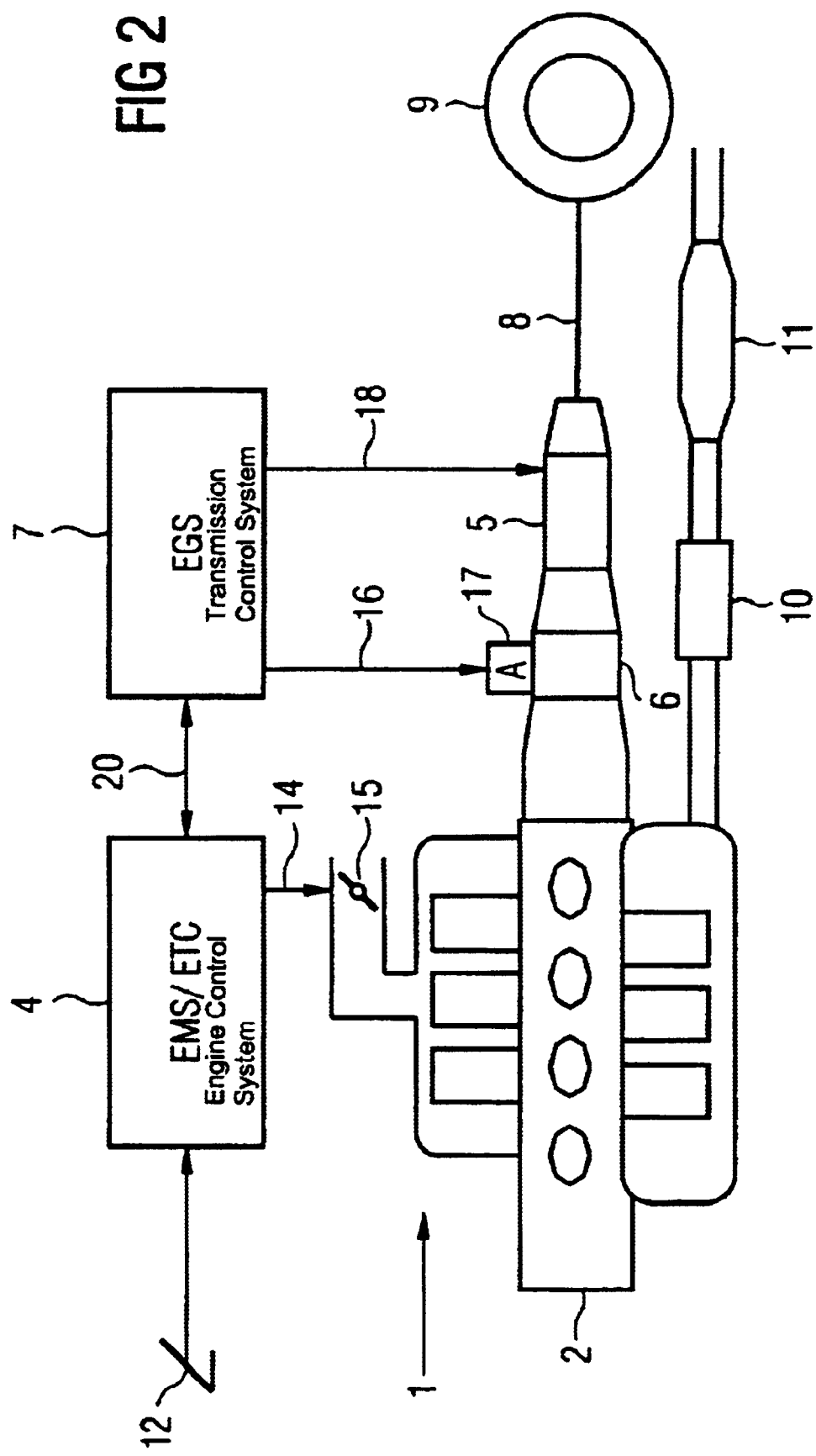

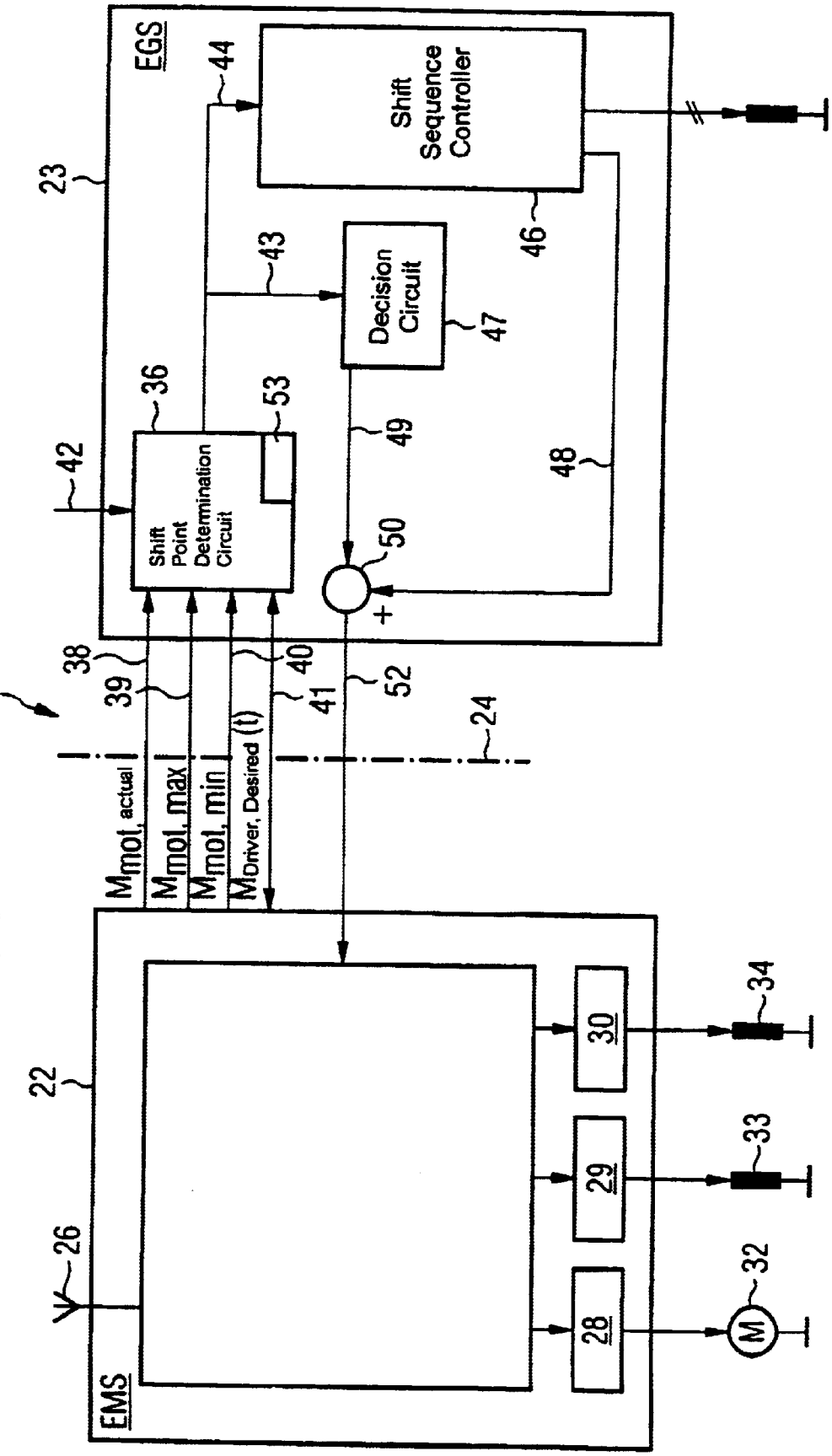

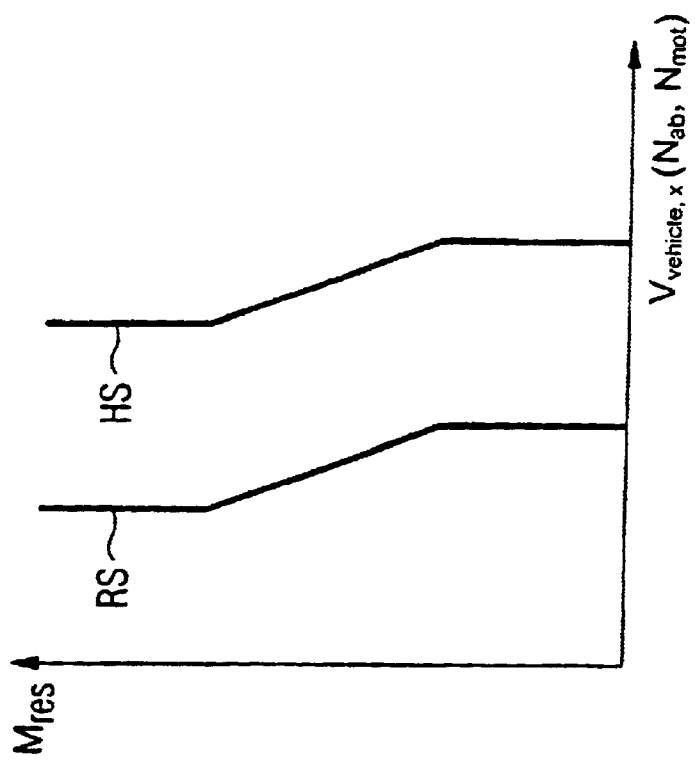
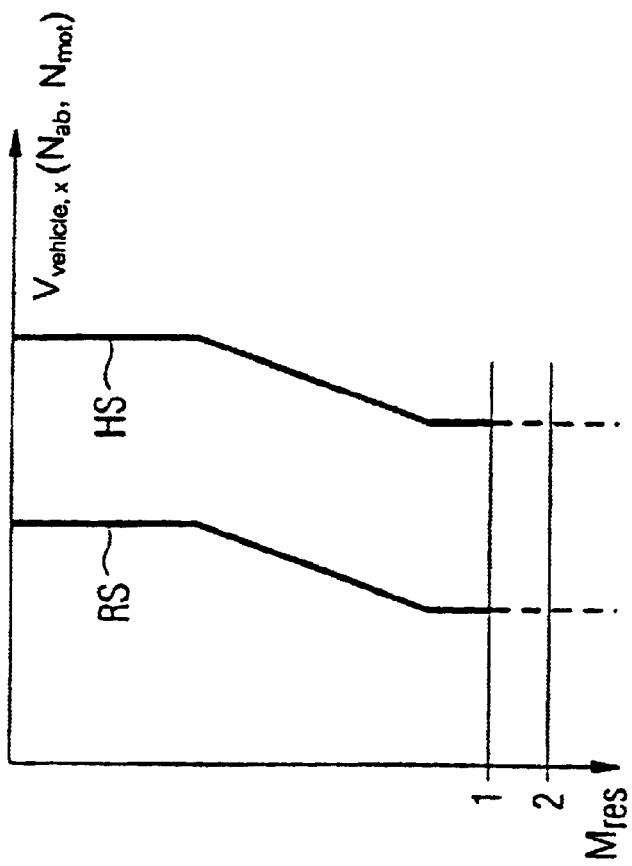

DRIVE-TRAIN CONTROL SYSTEM OF A MOTOR VEHICLE

CROSS-REFERENCE TO RELATED APPLICATION

This is a continuation of copending International Application PCT/DE99/01281, filed Apr. 30, 1999, which designated the United States.

BACKGROUND OF THE INVENTION

Field of the Invention

The invention relates to a drive-train control system for a motor vehicle which an engine and automatic transmission.

A drive-train control system of this kind includes an engine and an engine control system, and is used to control variables that influence engine torque, e.g. an ignition point and fuel metered to the cylinders. It also includes an automatic transmission and a transmission control system, which is used to control shift operations of the automatic transmission. The transmission shift points used by the transmission control system are stored in one or more map memories (e.g. International Patent Disclosure WO 91/13780).

In almost all known automatic transmission control systems, the respective gear to be selected is chosen by shift characteristics, which are stored in a map memory in the form of a function of or dependence on the vehicle speed and the position of the accelerator pedal or of the throttle valve. In defining the shift characteristics, it is assumed that there is a fixed correlation between a particular position of the accelerator pedal or throttle valve and a particular operating point of the engine. This applies both to the torque output and to the fuel consumption incurred in the process.

However, this assumption leads to difficulties if the position of the accelerator pedal or of the throttle valve does not bear an unambiguous relationship to the engine torque. This is the case, for example, when an engine has different operating modes. In the case of direct gas injection, for example, the power or torque during lean-mixture operation is determined by way of the injection time, with the throttle valve being fully open. In the case of normal operation at $\lambda=1$, on the other hand, the power and torque are adjusted by the throttle valve angle. In the case of diesel engines, there is no throttle valve at all and, in this case, the torque is adjusted by the injection time alone. Another example of the absence of a correlation between the engine torque output and an operating parameter of the engine is the position of the accelerator pedal in the case of an electronically controlled throttle valve (ETC). With a throttle valve of this kind, it is possible to implement a large number of functions, in which a single position of the accelerator pedal leads to different engine torques depending on the operating state. At low vehicle speeds and a small deflection of the accelerator pedal, for instance, a lower sensitivity is specified in order to make maneuvering and parking easier. In the case of shift operations in the transmission too, the engine torque is modified independently of the position of the accelerator pedal in order to stabilize the wheel torque.

Another known drive-train control system of a motor vehicle with an engine and an automatic transmission (see Japanese Preliminary Published Patent Application JP 7-89373 together with Japanese Abstract) is provided with an engine control system, by which variables that influence the engine torque are controlled, with a transmission control system, by which the shift operations of the automatic transmission are controlled, and with a map memory, in which transmission shift points used by the transmission control system are stored as a function of the vehicle speed and the engine torque. The map memory does not exchange any information with the engine control system. In particular, the transmission control system does not receive any information on the maximum engine torque and the maximum available torque reserve. The map memory is supplied only with information from sensors or detectors for the engine torque and the vehicle speed. The above-mentioned cases lead to maladjusted shift behavior if the engine characteristics assumed for the definition of the shift characteristics, i.e. a predetermined constant engine behavior, change in reality.

SUMMARY OF THE INVENTION

It is accordingly an object of the invention to provide a drive-train control system of a motor vehicle which overcomes the above-mentioned disadvantages of the prior art devices of this general type, in which the engine behavior is separated from the shift characteristics, i.e. to allow definition of the shift characteristics for the transmission in a manner which is largely independent of the engine characteristics.

With the foregoing and other objects in view there is provided, in accordance with the invention, a combination of a motor vehicle having an engine and an automatic transmission, with a drive-train control system. The drive-train control system has an engine control system for controlling variables that influence an engine torque and a transmission control system for controlling a ratio of the automatic transmission, the transmission control system being connected to the engine control system. A map memory is connected to the transmission control system and contains a shift map having characteristics defined in a vehicle-dependent manner taking into account a maximum possible engine torque. The transmission control system selects the ratio to be set from the shift map in dependence on a torque demanded by a driver and on a variable functionally linked to a speed of the motor vehicle.

The drive-train control system of the motor vehicle having an engine and an automatic transmission is provided with an engine control system by which variables that influence the engine torque are controlled, with a transmission control system by which the ratio of the automatic transmission is controlled, and with a map memory. From the map memory a ratio to be set by the transmission control system can be taken in dependence on the torque demanded by the driver and, on a variable functionally linked to the vehicle speed, and the characteristics of which are defined in a vehicle-dependent manner taking into account the maximum possible torque.

Some advantages of the invention are that, in conjunction with the choice of gear, it allows typical parameters for the engine torque produced to be found on the basis of the shift characteristics defined in accordance with the invention. The engine characteristics can be transmitted with significant variables from the engine control system to the transmission control system in compressed form, i.e. with very few data, so as to decouple the two systems as far as possible. The shift characteristics are defined in a manner which is as independent as possible from the engine and do not contain a torque model of the engine.

The engine characteristics are concentrated at the interface between the transmission and the engine. Therefore, the shift characteristics can be defined to a large extent independently of the engine. This eliminates the need to adapt them individually to different types of engine. Given the large number of options for a vehicle that are available today and the expectation of even more in the future—the so-called single platform with different engine and transmission options—leads to a considerable reduction in the development work required for the drive-train control system. Moreover, the invention allows consistently torque-based control of the drive train, which will gain widespread acceptance with the increasing introduction of electronically controlled throttle valves and the so-called torque interface. The interface between the engine and the transmission can thus be defined in such a way that specific characteristics of the components will in each case only be present in the system concerned.

As mentioned, there are cases where an engine has different characteristics depending on the operating mode (e.g. in the case of direct gas injection). In the case of conventional transmission control systems, this leads to complicated solutions, leading in extreme cases to a doubling in the number of shift maps. In the case of adaptive transmission control systems, up to 10 different shift maps are required. This complexity is reduced in an effective manner by the invention.

The subjective impression of the driver, i.e. the impression that the driver gets of the behavior and performance capabilities of the drive train, is essentially determined by the torque reserve. In this context, the driver gets a feeling for how much power the vehicle still has to spare at any given time (before the maximum available power output is reached) for accelerating the vehicle or climbing a slope at a uniform speed, for example. The invention is particularly advantageous because the subjective impression of the driver can be transferred to different vehicles with different engine options without any outlay.

Moreover, special operating modes of the engine (e.g. a decidedly economical mode), which result in special engine characteristics, can be readily taken into account. If a reduced maximum engine torque is available, the downshifts take place earlier without the need for a special set of characteristics for this purpose.

In accordance with an added feature of the invention, the shift map contains the ratio of the automatic transmission as a function of available torque reserve and an output speed of the automatic transmission.

In accordance with an additional feature of the invention, the shift map contains the ratio of the automatic transmission as a function of available torque reserve and the speed of the vehicle.

In accordance with another feature of the invention, the shift map contains shift points in a form of a function of a torque reserve available at a driven wheel and engine speed.

In accordance with a further feature of the invention, the shift map contains shift points as a function of a normalized engine torque.

In accordance with another added feature of the invention, the normalized engine torque is defined as a quotient of a current engine torque and the maximum possible engine torque.

In accordance with concomitant feature of the invention, the shift map is one of a plurality of shift maps containing the ratio of the automatic transmission, and an adaptation circuit is connected to the map memory. The adaptation circuit chooses one of the shift maps as a function of a driving state to determine the ratio.

Other features which are considered as characteristic for the invention are set forth in the appended claims.

Although the invention is illustrated and described herein as embodied in a drive-train control system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a block diagram of a drive train of a motor vehicle with a drive-train control system according to the invention;

FIG. 3 is a block diagram of the drive-train control system;

FIGS. 5 to 9 are graphs showing exemplary embodiments of characteristics for the drive-train control system shown in FIG. 3.

DESCRIPTION OF THE PREFERRED EMBODIMENTS

Figure 1:
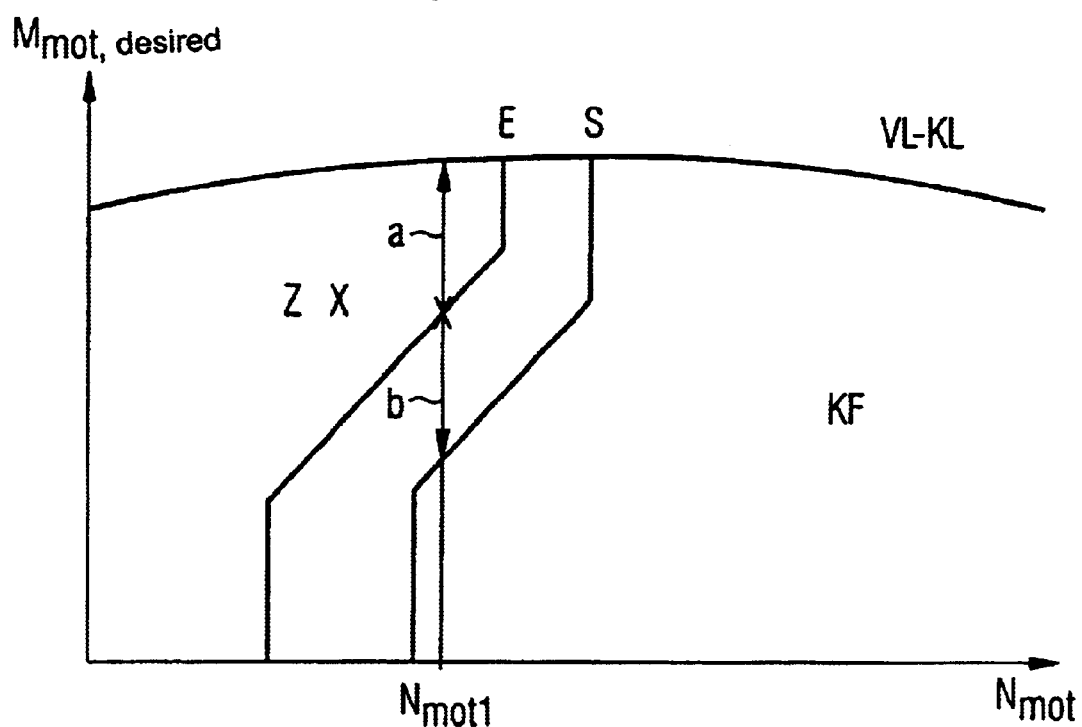
FIG. 1 is a simplified shift map for illustrating the invention of the instant application.

In all the figures of the drawing, sub-features and integral parts that correspond to one another bear the same reference symbol in each case. To make the illustration clearer and the explanation simpler, just two shift characteristics of an engine map KF are illustrated in FIG. 1. FIG. 1 shows a shift characteristic E for an economical, fuel-saving driving mode and a characteristic S for a performance-oriented, sporty driving mode. An engine torque or a desired engine torque $M_{mot,desired}$ demanded by the driver, which the engine can provide with a certain delay, is plotted on the ordinate of the map. An engine speed $N_{mot}$ is plotted on the abscissa of the diagram. The characteristics E and S define the shift points for the economy and sports shift programs, respectively. The shift points are generally based on the vehicle speed $V_{vehicle,x}$ but, because of the proportionality between the vehicle speed and the engine speed (given a constant transmission ratio), they can be transferred to the engine map. A full-load characteristic VL-KL indicates the respective maximum engine torque.

An upshift is triggered when the shift characteristic is exceeded from right to left. From the drawing, it can be seen that a driving strategy or driving mode that minimizes fuel consumption leads to a shift operation at lower engine speeds or vehicle speeds than a sporty driving mode. As a result, the engine-operating point in this case is very close to the operating range for optimum consumption, which is indicated in a highly simplified form in the drawing by its center Z.

At the vehicle speed or the engine speed $N_{mot1}$, the maximum torque reserve in the case of an economical driving strategy is $$M_{res} = M_{mot,max} - M_{driver,desired,min} = a. \quad (I)$$

If the performance-optimized shift program of the transmission control system is active, on the other hand, the torque reserve is $$M_{Res}=M_{mot,max}-M_{driver,desired,min}=a+b. \quad \text{(II)}$$

This torque reserve is larger in a given gear than that in the case of an economical driving strategy. It is apparent that there is an improved acceleration capability since, no up-shift takes place in zone b of the engine map KF in the case of a performance-oriented shift program and, more engine torque can be brought into play.

The torque reserve is one of the main criteria for the configuration of shift maps in accordance with the invention. In more fuel economy oriented applications, it will be smaller whereas, in performance-oriented shift programs, it will be larger since, in this case, the upshift takes place only "later", i.e. at a higher engine torque and a higher engine speed. In the case of shift programs configured for climbing hills too, the shift will take place only at a higher engine and output speed in order to avoid hunting. An adaptive transmission control system is capable of making a choice between the various shift programs automatically without the intervention of the driver (see European Patent EP 0 576 703 B2).

The torque reserve is a factor which, given a knowledge of the maximum possible instantaneous engine torque $M_{mot,max}$—which is dependent on the engine speed or engine condition—now depends only on the driving situation and hence on the selected shift map and on the engine torque $M_{driver,desired}$ (t) demanded by the driver. The definition of the shift map is thus now only vehicle-dependent.

The variable referred to as the torque reserve, which is calculated or taken from the shift map, has a physical dimension, making it easier to incorporate into a consideration of the overall drive train, unlike known drive-train control systems, which evaluate the position of the accelerator pedal directly.

A schematically illustrated drive train 1 (FIG. 2) of a motor vehicle includes: an engine 2 with an electronic engine control system 4, which can also act as a traction control system ETC, an automatic transmission 5 with a torque converter 6 and an electronic transmission control system 7. The drive system for the wheels is indicated by a universally jointed shaft 8 and a driven wheel 9, while the exhaust system is indicated by a catalytic converter 10 and a muffler 11. The driver uses an accelerator pedal 12 to indicate his requirements to the engine control system 4, which for its part controls the engine accordingly. This is indicated by a signal line 14, which adjusts a throttle valve 15. The control of the injection point and the quantity of fuel injected into the engine 2 are not illustrated since these are likewise universally familiar.

The transmission control system 7 controls a lock-up clutch 17 for the torque converter 6 via a signal line 16 and controls the ratio of the transmission 5 via a signal line 18. The engine control system 4 and the transmission control system 7 are connected to one another by bidirectional signal and control lines 20, in the form of a data bus for example, and, via these data lines, exchange information required for smooth and economical operation of the motor vehicle.

A schematically illustrated drive-train control system 21 (FIG. 3) of the motor vehicle contains an electronic engine control system (abbreviated to EMS) 22 and an electronic transmission control system (EGS) 23, which communicate with one another via a schematically indicated interface 24, exchanging data on operating variables of the motor vehicle and control signals, in particular in the form of physical describing variables.

The engine control system 22 receives signals from the accelerator pedal 12 via a line 26 and has three control signal outputs: a signal output 28 for the throttle valve, a signal output 29 for the fuel injection system and a signal output 30 for controlling the ignition angle of the motor-vehicle engine. The signal output 28 is used to control an electric motor 32 that actuates the throttle valve 15 of the motor vehicle. The signal outputs 29 and 30 are used to control actuators 33 and 34 (embodied as piezoelectric or inductive actuators for example), which adjust the quantity of fuel to be injected and the ignition angle of the engine 2. The transmission control system 23 has the following components: a shift-point determination circuit 36, which receives data explained below, e.g. data on engine torque values, and from the engine control system 22 via lines 38 to 40. Via a line 41, it receives information on the desired engine torque $M_{mot,desired}$ specified by the driver of the motor vehicle. Via a line 42, the shift-point determination circuit 36 receives the respective output speed of the transmission $N_{ab}$, which corresponds to the wheel speed and hence—for a given transmission ratio—the speed of the motor vehicle $V_{veh,x}$. Via a branching signal line 43, 44, the shift-point determination circuit 36 sends a shift command to a shift-sequence controller 46 and to a decision circuit 47. The lines 38 to 41, where present, are elements of the interface 24.

The shift-sequence controller 46 and the decision circuit 47 are connected by respective lines 48 and 49 to respective inputs of an adder or summing point 50. By the line 48, the adder 50 and a line 52 leading to the engine control system 22, the shift-sequence controller 46 communicates the amplitude or intensity of adjustment of the engine torque and information on its variation with respect to time. The adder 50 can also be contained in the engine control system 2. Within the drive-train control system 21, the flow of signals and control information is as follows: the information on the engine torque $M_{driver,desired}$ (t) demanded by the driver of the motor vehicle and information on the minimum engine torque $M_{mot,min}$ (t) and maximum engine torque $M_{mot,max}$ (t) at the instantaneous engine speed are transmitted from the engine control system 22 to the transmission control system 23 via line 41 and via lines 40 and 39 respectively. The information $M_{mot,max}$ (t) can take account of all losses, including other torque consumers downstream of the crankshaft—such as an air-conditioning system, power steering etc.—in order to express the true maximum possible transmission input torque $M_{an,max}$.

The actual engine torque available is transmitted from the engine control system 22 to the transmission control system 23 via the line 38. Here too, any possible torque loads on the engine 2 can be taken into account by being subtracted from the engine torque produced.

In the shift-point determination circuit 36, the required shift point for the transmission is determined using the above-mentioned data. The shift point is determined or the gear selected adaptively by selection of a suitable map in accordance with the driving style of the respective driver and the driving state of the motor vehicle or, alternatively, by appropriate modification of a basic map. The engine torque can be influenced outside the circuit by the decision circuit 47. The shift-sequence controller 46 controls the gear change itself and, for this purpose, it can also influence the engine torque during the shift operation. The control signals produced by the decision circuit 47 and the shift-sequence controller 46 are fed via the lines 48 and 49 to the adder 50 and are there combined to give an intervention signal, which is transmitted to the engine control system 22 via the line 52.

Figure 4:
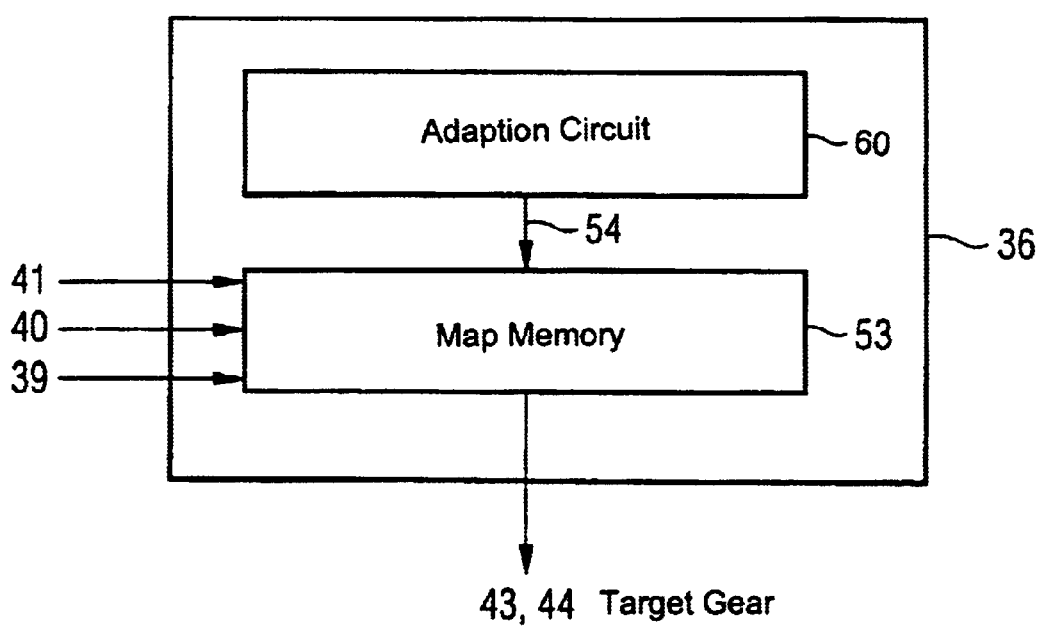
FIG. 4 is a block diagram of a shift-point determination circuit of the drive-train control system shown in FIG. 3.

The shift-point determination circuit 36 (FIG. 4) contains an adaptation circuit 60 and a map memory 53, in which a plurality of shift maps are stored. The map memory 53 is configured as a shift map memory and contains the shift points of the transmission—or, in the case of a continuously variable transmission (CVT): a set ratio—in the form of a dependence on or function of the engine torque and the engine speed. (Details of this will be explained with reference to FIGS. 5 to 9.)

The adaptation-circuit 60 selects a shift map from the map memory 53 via a line 54 or, alternatively, adjusts individual shift characteristics. An adjustment of the shift characteristics to the right (see FIG. 1), i.e. toward higher shift speeds, results in a larger torque reserve. The signals transmitted via lines 39 to 41 (which have been explained with reference to FIG. 3) influence the shift operation as already explained. The target gear, i.e. the gear to be selected by the transmission—or, in more general terms, the transmission ratio i to be set—is output via the lines 43, 44.

There are several possibilities for defining the coordinate axes of a shift map containing the shift points in the form of shift characteristics.

Figure 5:
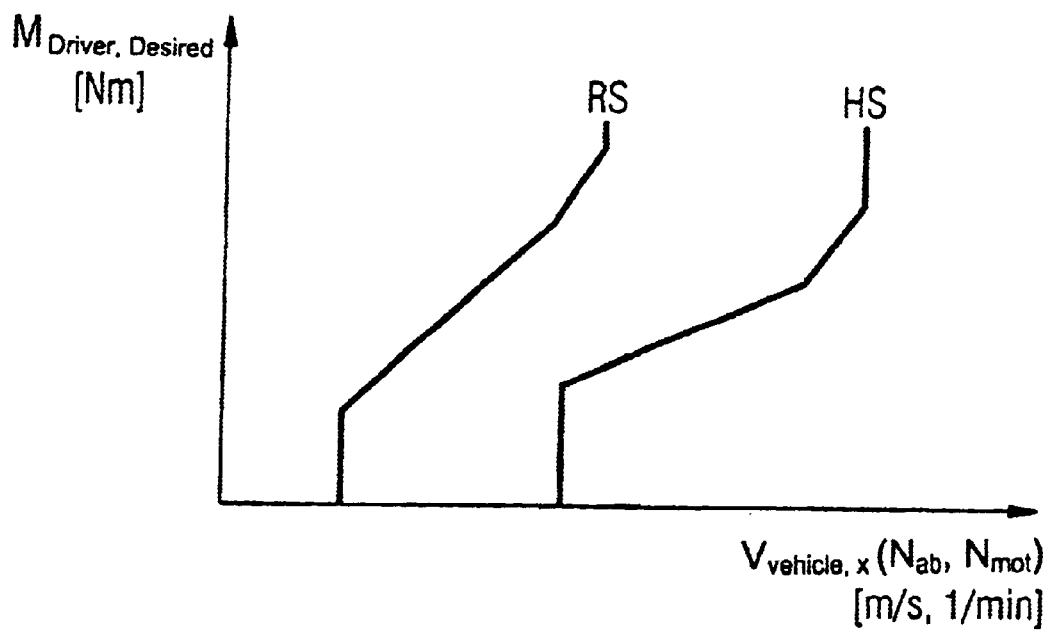

The ordinate represents the engine torque $M_{driver,desire}$ demanded by the driver (FIG. 5). The vehicle speed $V_{vehicle}$, x, which corresponds to the output speed $N_{ab}$ of the transmission, is plotted on the abscissa. An up-shift characteristic HS and a downshift characteristic RS are illustrated.

It is assumed that the engine 2 is capable of delivering the engine torque $M_{driver,desired}$ demanded by the driver. In this case, the configuration of the shift characteristics must also include the maximum possible engine torque since it is not used as an updated parameter by the engine control system 22.

Another possibility is to normalize the current engine torque by dividing it by the maximum possible engine torque and to use the dimensionless quotient formed as the ordinate of the map (FIG. 6):

$$K_{res,inv} = M_{driver,desired}(t) / M_{mot,max}(t). \quad (III)$$

This representation allows a more far-reaching generalization since it is not necessary to incorporate the maximum possible engine torque in the configuration of the shift characteristics; instead, it is supplied as an updated parameter by the engine control system 22.

At the engine, the torque reserve (see FIG. 1) can be transferred in such a way to the shift map thus formed that a shift point is defined by the vehicle speed and the quotient $K_{res,inv}$, which represents the ratio of the current engine torque to the maximum possible engine torque. In other words, if more than 50% of the maximum possible engine torque is demanded, for example, a downshift is defined at a vehicle speed x. This makes possible a generalization of the shift behavior thus defined, making it suitable for several different engines, namely providing a shift behavior that the driver will find equivalent since the drivability reserves will be relatively equal in the same gear.

Another variant is to represent the shift characteristics as a function of the vehicle speed and the torque reserve (FIG. 7). Calculation is performed in the shift-point determination element 25:

$$M_{res} = M_{mot,max}(t) - M_{driver,desired}(t). \quad (IV)$$

The required data are continuously updated by the engine control system 2.

FIG. 7 shows the shift characteristics in the accustomed form but, for this purpose, the torque reserve $M_{res}$ must be scaled in an unconventional manner since, with the maximum reserve torque, for example, there is no torque demand from the driver and it is therefore zero. Such a representation has the advantage of being independent of the engine since the maximum torque reserve does not have to be known and the shift characteristics are transferable. In the case of an engine with a larger maximum torque, the ordinate and hence also the shift characteristic are extended downward to a value $M_{res2}$, permitting suitable interpolation methods for determining the shift speed. Downshifts then take place in the case of a higher engine torque demand $M_{driver,desired}$ (t).

FIG. 8 represents the same state of affairs as FIG. 7 but with reverse scaling of the reserve torque.

Figure 6:
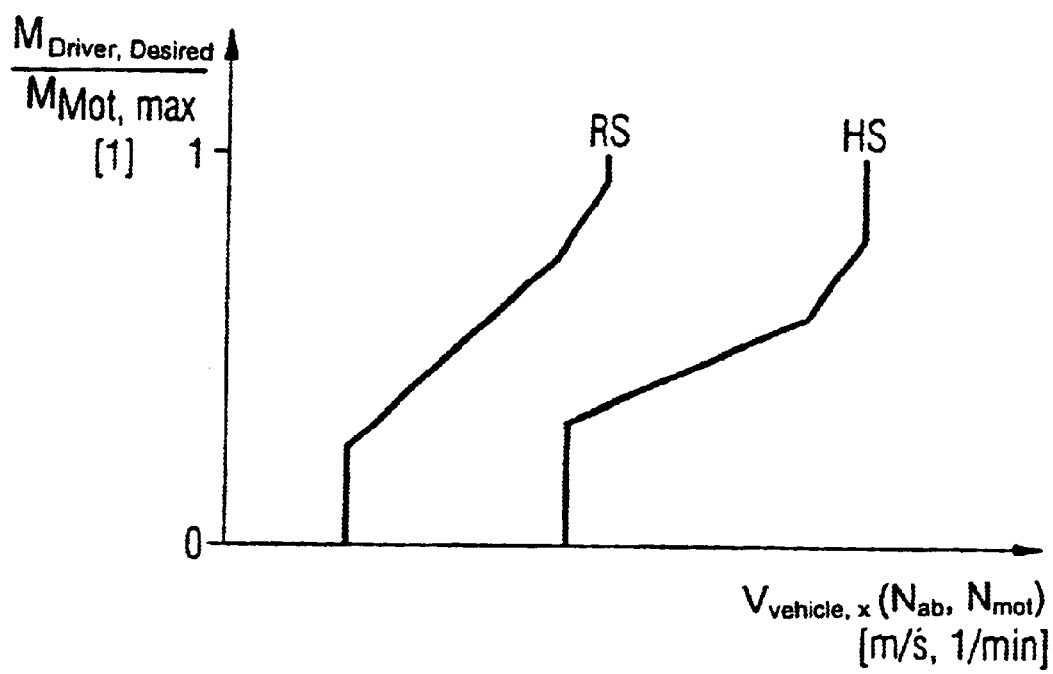
Figure 9:
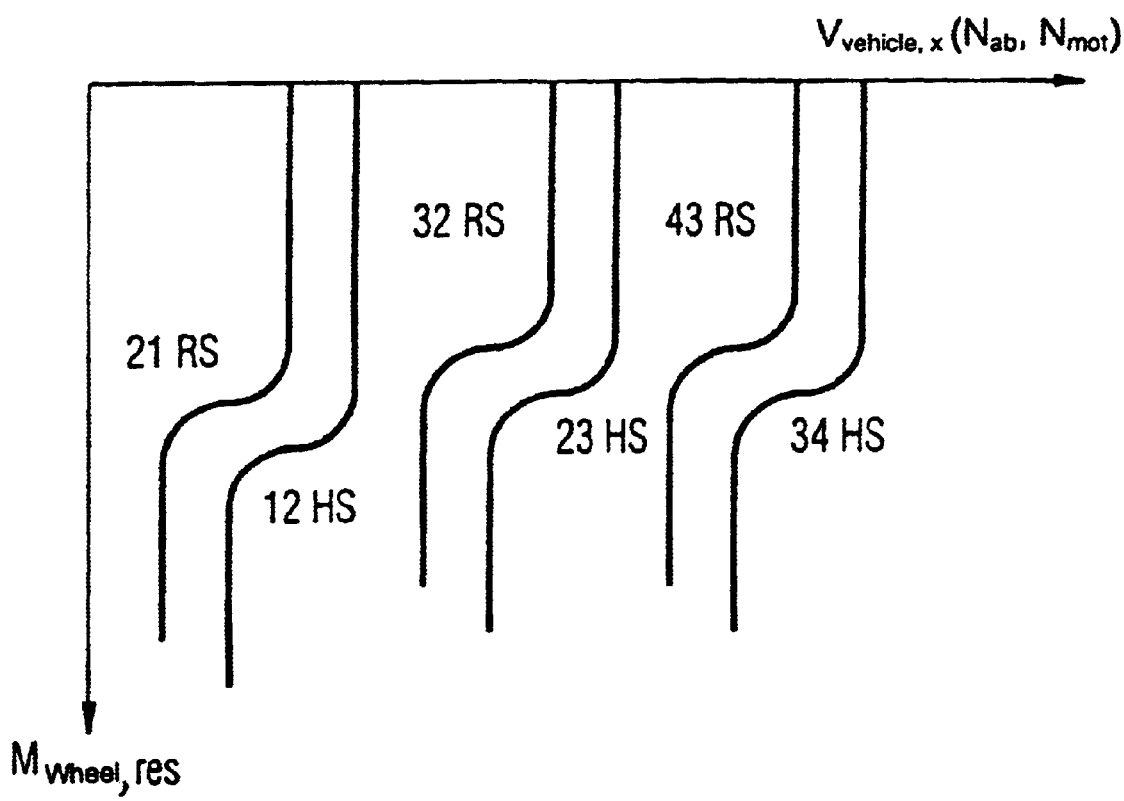

As with the definition of the shift characteristics in accordance with FIGS. 7 and 8, the shift characteristics (or: shift curves) can also be defined as a function of the vehicle speed $V_{vehicle,x}$ and the reserve torque $M_{wheel,res}$ at a driven wheel (FIG. 9), the wheel torque being concentrated computationally on one wheel:

$$M_{wheel,res}(t) = M_{wheel,max}(t) - M_{wheel,driver}(t) \quad (V)$$

$$M_{wheel,max}(t) = M_{mot,max}(t)*i \quad (VI)$$

where i is the transmission ratio determined mechanically by the gear selected (corresponding to the target gear in FIG. 6). This solution (FIG. 9) is suitable particularly for systems with coordinated drive-train management (also referred to as IPM), which interpret the position of the accelerator pedal as the set wheel torque. Because of the multiplication of the engine torque by the transmission ratio, the shift characteristics are of different lengths along the ordinate in FIG. 9.

Figure 10:
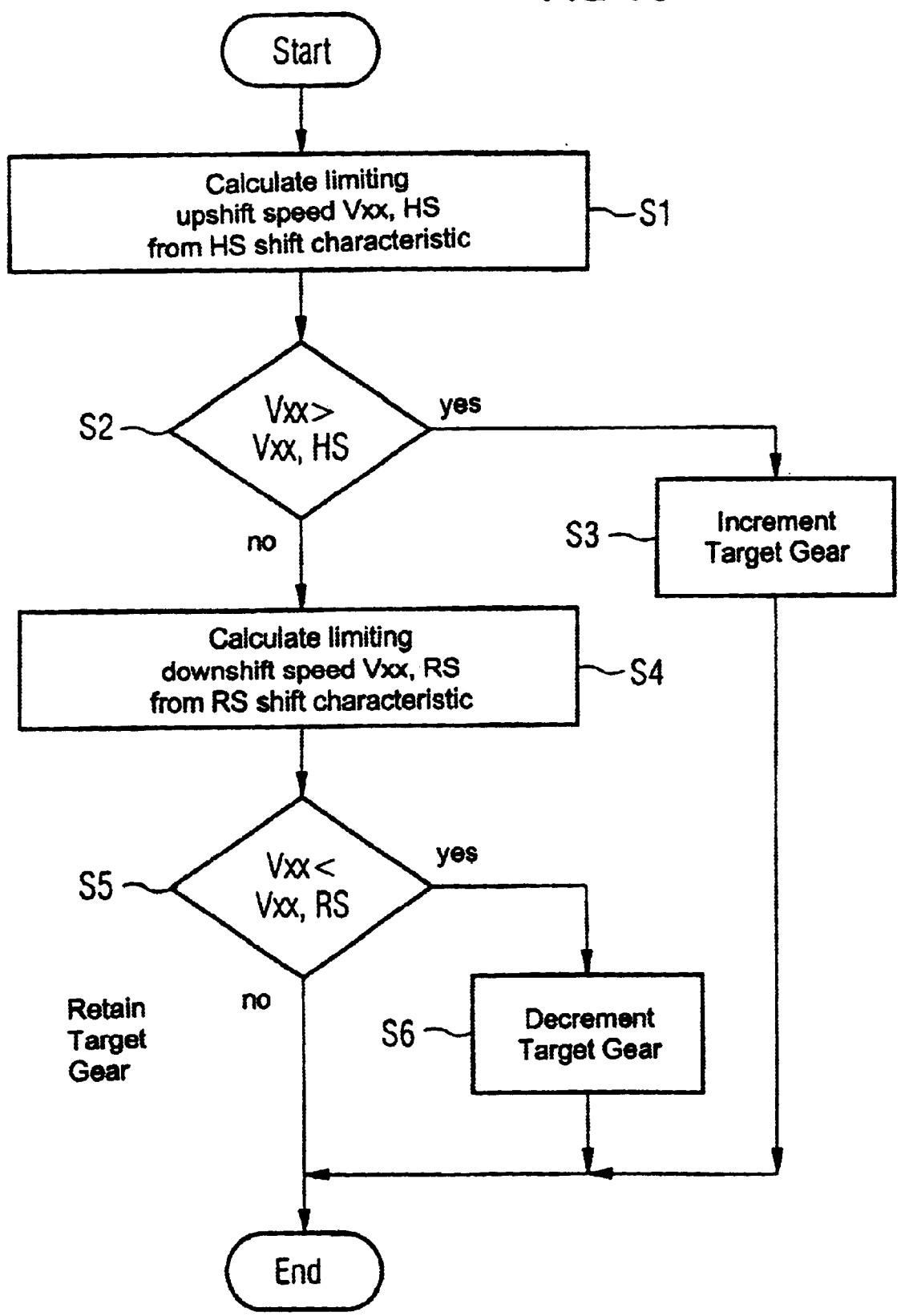
FIG. 10 is a flow chart of a program executed in the drive-train control system shown in FIGS. 3 and 6.

To define the transmission ratio or the target gear, which amounts to the same thing, the following program is executed in the drive-train control system (FIG. 10).

After starting, a limiting rotational speed is calculated in a step S1 from the ordinate value of the upshift characteristic HS stored in the map. This calculation applies to all the alternatives shown in FIGS. 4, 5, 7, 8 and 9 and is accordingly torque-based. The up-shift characteristics and downshift characteristics RS are calculated in a similar manner.

In step S2, the limiting rotational speed $V_{xx,HS}$ is compared with the respective current vehicle speed $V_{xx}$. If $V_{xx} > V_{xx,HS}$, the target gear is increased in a step S3. Otherwise, a limiting downshift rotational speed $V_{xx,RS}$ is calculated in a step S4 from the downshift characteristic RS. In a step S5, these two values are compared with one another.

If $V_{xx} > V_{xx,RS}$, the target gear is reduced by one in a step S6. Otherwise, the target gear is retained.

The program run has then reached its end.

The flow diagram in FIG. 10 shows that the target gear output by the shift-point determination circuit 36 is retained unless a shift characteristic is exceeded. If the transmission control system 23 carries out an adaptive adjustment of the shift behavior to the driving style of the driver or to the driving situation, the shift characteristic of the respectively active shift map (e.g. for sporty or economical driving, for uphill travel, for high-speed motorway travel etc.) is used for the shift-point determination carried out in accordance with FIG. 10.

We claim:

1. In combination with a motor vehicle having an engine and an automatic transmission, a drive-train control system comprising:

an engine control system for controlling variables that influence an engine torque;

a transmission control system for controlling a ratio of the automatic transmission, said transmission control system connected to said engine control system; and a map memory connected to said transmission control system and containing a shift map;

said transmission control system setting a desired ratio being taken from said shift map in dependence on a maximum possible engine torque, a torque demanded by a driver and a variable functionally linked to a speed of the motor vehicle.

2. The drive-train control system according to claim 1, wherein said shift map contains the ratio of the automatic transmission as a function of available torque reserve and an output speed of the automatic transmission.

3. The drive-train control system according to claim 1, wherein said shift map contains the ratio of the automatic transmission as a function of available torque reserve and the speed of the vehicle.

4. The drive-train control system according to claim 1, wherein said shift map contains shift points in a form of a function of a torque reserve available at a driven wheel and engine speed.

5. The drive-train control system according to claim 1, wherein said shift map contains shift points as a function of a normalized engine torque.

6. The drive-train control system according to claim 5, wherein the normalized engine torque is defined as a quotient of a current engine torque and the maximum possible engine torque.

7. The drive-train control system according to claim 1, wherein said shift map is one of a plurality of shift maps containing the ratio of the automatic transmission, and including an adaptation circuit connected to said map memory, and said adaptation circuit chooses one of said shift maps as a function of a driving state to determine the ratio.

* * * * *